US010808547B2

(12) United States Patent
Lessard et al.

(10) Patent No.: US 10,808,547 B2
(45) Date of Patent: Oct. 20, 2020

(54) TURBINE ENGINE AIRFOIL WITH COOLING

(71) Applicant: General Electric Company, Schenectady, NY (US)

(72) Inventors: Bridget Lucy Lessard, Groveland, MA (US); Bhanu Mahasamudram Reddy, Boxford, MA (US); Gaoqiu Zhu, Andover, MA (US); Michael Jong Lee, Peabody, MA (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 15/018,155

(22) Filed: Feb. 8, 2016

(65) Prior Publication Data

US 2017/0226869 A1 Aug. 10, 2017

(51) Int. Cl.
*F01D 5/18* (2006.01)
*F01D 9/04* (2006.01)
*F01D 25/12* (2006.01)

(52) U.S. Cl.
CPC .............. *F01D 5/187* (2013.01); *F01D 5/181* (2013.01); *F01D 5/185* (2013.01); *F01D 5/186* (2013.01); *F01D 9/041* (2013.01); *F01D 25/12* (2013.01); *F05D 2220/32* (2013.01); *F05D 2240/126* (2013.01); *F05D 2240/30* (2013.01); *F05D 2260/20* (2013.01); *F05D 2260/202* (2013.01); *F05D 2260/203* (2013.01); *F05D 2260/204* (2013.01); *F05D 2260/941* (2013.01); *Y02T 50/676* (2013.01)

(58) Field of Classification Search
CPC .......... F01D 5/187; F01D 25/12; F01D 5/188; F01D 5/189; F01D 9/041; F05D 2220/32; F05D 2240/126; F05D 2240/30; F05D 2260/20; F05D 2260/941
See application file for complete search history.

(56) References Cited

U.S. PATENT DOCUMENTS

| 2,779,565 A | 1/1957 | Bruckmann |
| 2,888,243 A | 5/1959 | Pollock |
| 3,011,759 A | 12/1961 | Stalker |
| 3,192,578 A | 7/1965 | McCormick |

(Continued)

FOREIGN PATENT DOCUMENTS

| EP | 2 489 838 A2 | 8/2012 |
| EP | 2 713 012 A1 | 4/2014 |
| GB | 2 349 920 A | 11/2000 |

OTHER PUBLICATIONS

Extended European Search Report and Opinion issued in connection with corresponding EP Application No. 17154677.3 dated Jun. 22, 2017.

(Continued)

*Primary Examiner* — David E Sosnowski
*Assistant Examiner* — Theodore C Ribadeneyra
(74) *Attorney, Agent, or Firm* — McGarry Bair PC (57) ABSTRACT

An apparatus and method of cooling an airfoil for a gas turbine engine includes a tip for the radially outer end of the airfoil with internal ribs defining cooling circuits within an interior of the airfoil. The ribs can be full-length, extending between a root and tip of the airfoil. A gap can be formed in the full-length ribs near the tip to form a thermal stress reduction structure for the full-length rib.

17 Claims, 6 Drawing Sheets

(56) References Cited

U.S. PATENT DOCUMENTS

| | | |
|---|---|---|
| 3,468,513 A | 9/1969 | Schmitz |
| 3,627,443 A | 12/1971 | Pirzer |
| 3,982,851 A | 9/1976 | Andersen et al. |
| 4,073,599 A * | 2/1978 | Allen ................. F01D 5/187 416/97 R |
| 4,177,010 A | 12/1979 | Greaves et al. |
| 4,257,737 A * | 3/1981 | Andress ............. F01D 5/187 415/115 |
| 4,767,268 A * | 8/1988 | Auxier ............... F01D 5/187 415/115 |
| 5,387,085 A * | 2/1995 | Thomas, Jr. ........ F01D 5/187 415/115 |
| 5,403,157 A * | 4/1995 | Moore ............... F01D 5/188 415/115 |
| 5,462,405 A * | 10/1995 | Hoff .................. F01D 5/187 415/115 |
| 5,667,359 A | 9/1997 | Huber et al. |
| 5,902,093 A * | 5/1999 | Liotta ................. F01D 5/20 415/115 |
| 6,139,269 A * | 10/2000 | Liang ................. F01D 5/20 416/97 R |
| 6,168,381 B1 * | 1/2001 | Reddy ............... F01D 5/186 415/116 |
| 6,186,741 B1 * | 2/2001 | Webb ................ F01D 5/187 415/115 |
| 6,224,336 B1 | 5/2001 | Kercher |
| 6,340,047 B1 * | 1/2002 | Frey .................. B22C 21/14 164/122.1 |
| 6,347,923 B1 * | 2/2002 | Semmler ........... F01D 5/187 416/97 R |
| 6,431,832 B1 * | 8/2002 | Glezer ............... F01D 5/187 416/97 R |
| 6,595,748 B2 * | 7/2003 | Flodman ........... F01D 5/186 415/115 |
| 6,932,573 B2 * | 8/2005 | Liang ................. F01D 5/187 415/115 |
| 7,104,757 B2 * | 9/2006 | Gross ................. F01D 5/187 415/115 |
| 7,137,780 B2 * | 11/2006 | Liang ................. F01D 5/187 416/90 R |
| 7,334,991 B2 | 2/2008 | Liang |
| 7,435,058 B2 | 10/2008 | Campbell et al. |
| 7,547,190 B1 * | 6/2009 | Liang ................. F01D 5/186 416/97 R |
| 7,713,027 B2 | 5/2010 | Cherolis et al. |
| 8,016,564 B1 * | 9/2011 | Liang ................. F01D 5/186 415/115 |
| 8,025,482 B1 * | 9/2011 | Liang ................. F01D 5/187 415/115 |
| 8,177,507 B2 * | 5/2012 | Pietraszkiewicz ... F01D 5/186 415/115 |
| 8,202,054 B2 * | 6/2012 | Liang ................. F01D 5/186 416/97 R |
| 8,591,189 B2 * | 11/2013 | Correia ............. F01D 5/187 416/96 R |
| 8,911,208 B2 | 12/2014 | Propheter-Hinckley et al. |
| 8,920,123 B2 * | 12/2014 | Lee .................. F01D 5/186 416/92 |
| 9,017,027 B2 | 4/2015 | Campbell et al. |
| 9,546,554 B2 * | 1/2017 | Crites ............... F01D 5/187 |
| 10,370,980 B2 * | 8/2019 | Taffet ............... F01D 5/187 |
| 2003/0026698 A1 | 2/2003 | Flodman et al. |
| 2010/0047078 A1 * | 2/2010 | Townes ............. F01D 5/186 416/97 R |
| 2014/0193273 A1 * | 7/2014 | Bommanakatte ...... F01D 5/189 416/96 R |
| 2015/0044041 A1 | 2/2015 | Munshi et al. |

OTHER PUBLICATIONS

Machine Translation and First Office Action and Search issued in connection with corresponding CN Application No. 201710069301.2 dated Aug. 15, 2018.

* cited by examiner

TURBINE ENGINE AIRFOIL WITH COOLING

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades require one or more interior cooling channels for routing the cooling air through the blade to cool different portions of the blade in order to prevent excessive temperatures during operation. During cooling and engine operation, the blades are exposed to thermal cycling, which can stress the components of the blade. The stresses can lead to cracking of portions of the blade.

BRIEF DESCRIPTION OF THE INVENTION

In one aspect, the invention relates to an airfoil for a gas turbine engine including an outer surface bounding an interior and defining a pressure side and a suction side extending axially between a leading edge and a trailing edge to define a chord-wise direction, and extending radially between a root and a tip to define a span-wise direction. The airfoil further includes a cooling circuit located within the interior and having a chord-wise spaced, full-length rib and partial-length rib to define a flow channel therebetween, with the full-length rib extending span-wise from the root to the tip and in contact with the tip, and the partial-length rib extending span-wise and terminating prior to the tip to define a tip turn for the flow channel. Further still, the airfoil includes a gap in the full-length rib spaced from the tip to form a thermal stress reduction structure for the full-length rib.

In another aspect, the invention relates to a method of mitigating thermal-induced low cycle fatigue cracking in an internal rib extending span-wise from a tip of an airfoil for a gas turbine engine, the method including opening at least a portion of the internal rib a predetermined distance from the tip.

In yet another aspect, the invention relates to an airfoil for a gas turbine engine including an outer surface bounding an interior and defining a pressure side and a suction side extending axially between a leading edge and a trailing edge to define a chord-wise direction and extending radially between a root and a tip to define a span-wise direction, a rib at least partially defining a cooling circuit within the interior and extending span-wise from the tip while spanning the interior between the pressure side and the suction side, and a gap in the rib spaced from the tip to form a thermal stress reduction structure for the rib.

DESCRIPTION OF EMBODIMENTS OF THE INVENTION

The described embodiments of the present invention are directed to systems, methods, and other devices related to routing air flow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

Figure 1:
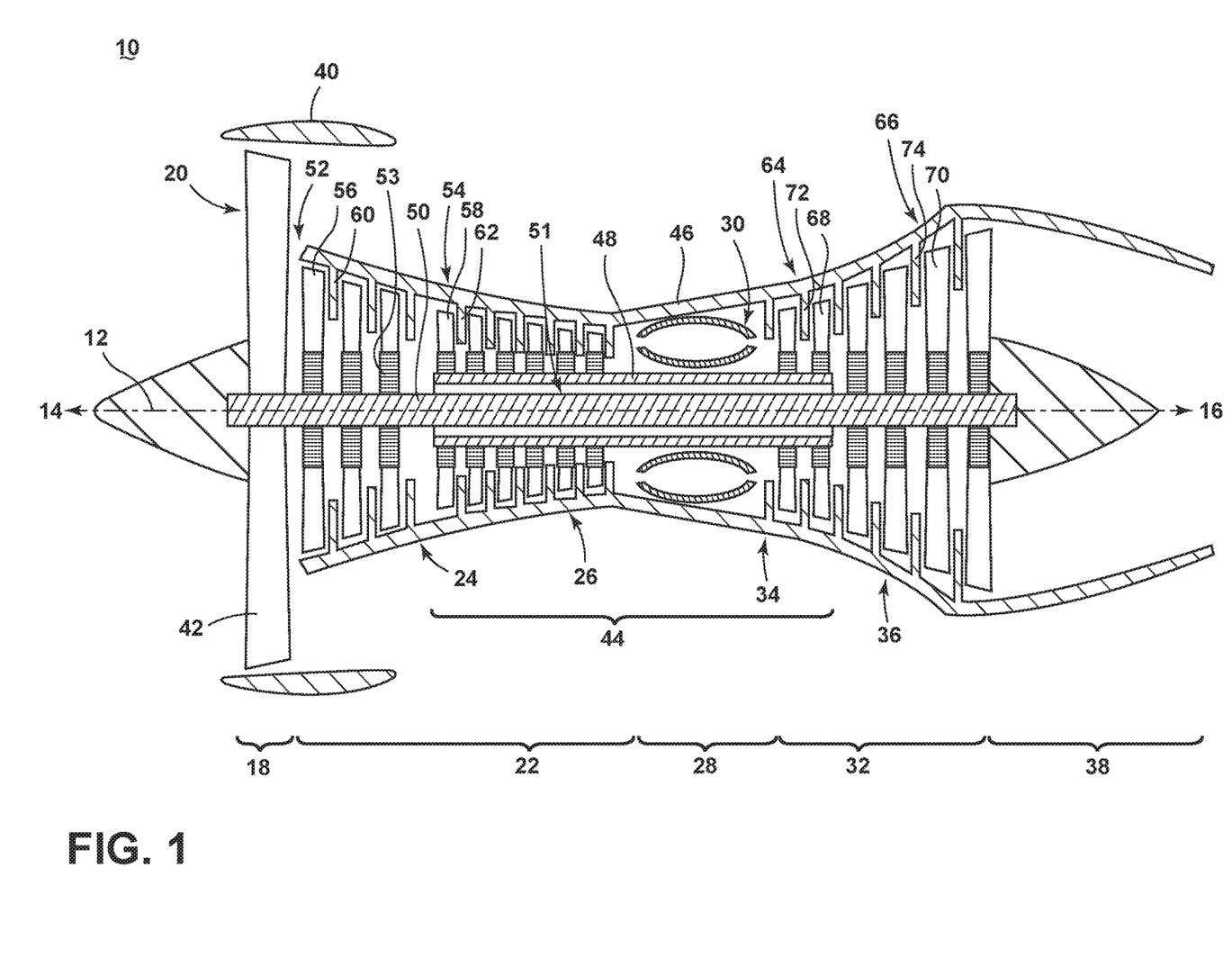
FIG. 1 is a schematic, sectional view of a gas turbine engine.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
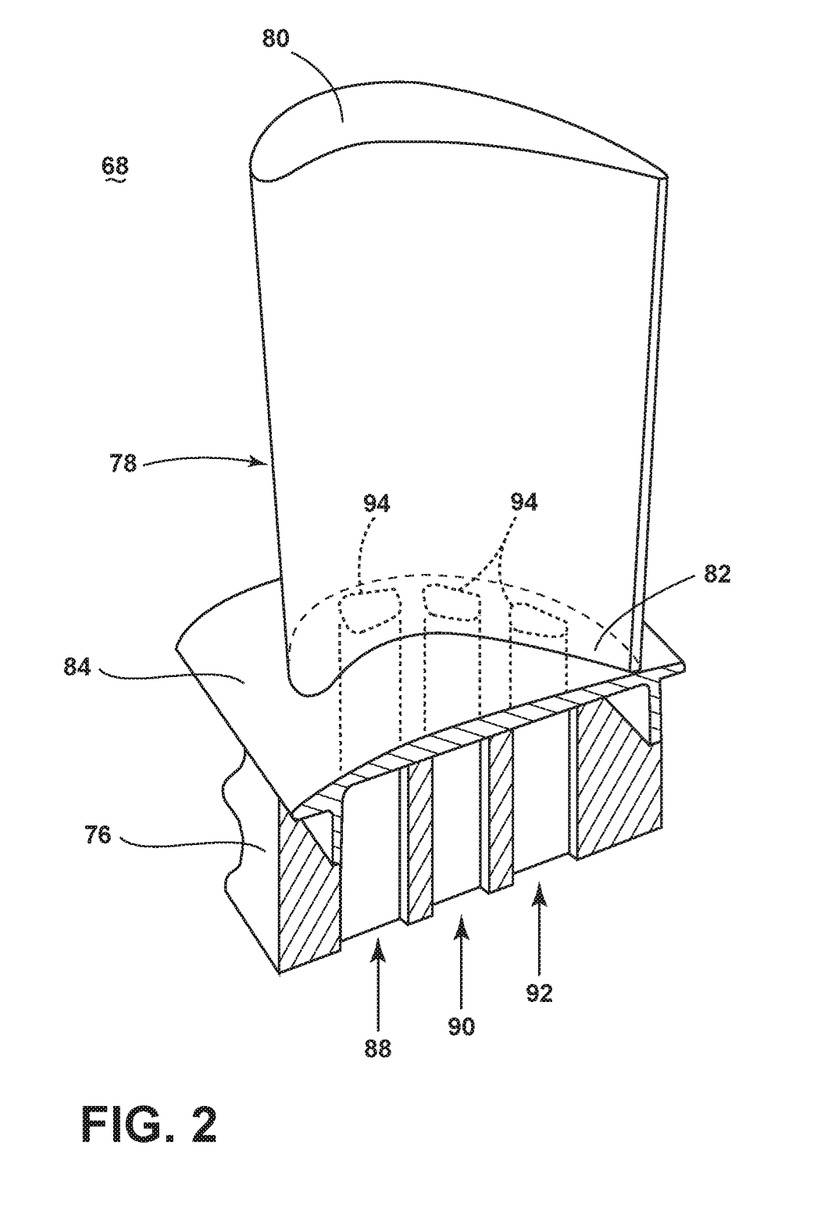
FIG. 2 is perspective view of an airfoil of the engine of FIG. 1.

FIG. 2 is a perspective view of an engine component in the form of one of the turbine blades 68 of the engine 10 from FIG. 1. The turbine blade 68 includes a dovetail 76 and an airfoil 78. Alternatively, the airfoil 78 can be any vane of the engine 10. The airfoil 78 extends from a tip 80 to a root 82 to define a span-wise direction. The dovetail 76 further includes a platform 84 integral with the airfoil 78 at the root 82 to radially contain the turbine airflow. The dovetail 76 mounts to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. It should be appreciated that the dovetail 76 is shown in cross-section, such that the inlet passages 88, 90, 92 are housed within the body of the dovetail 76.

Figure 3:
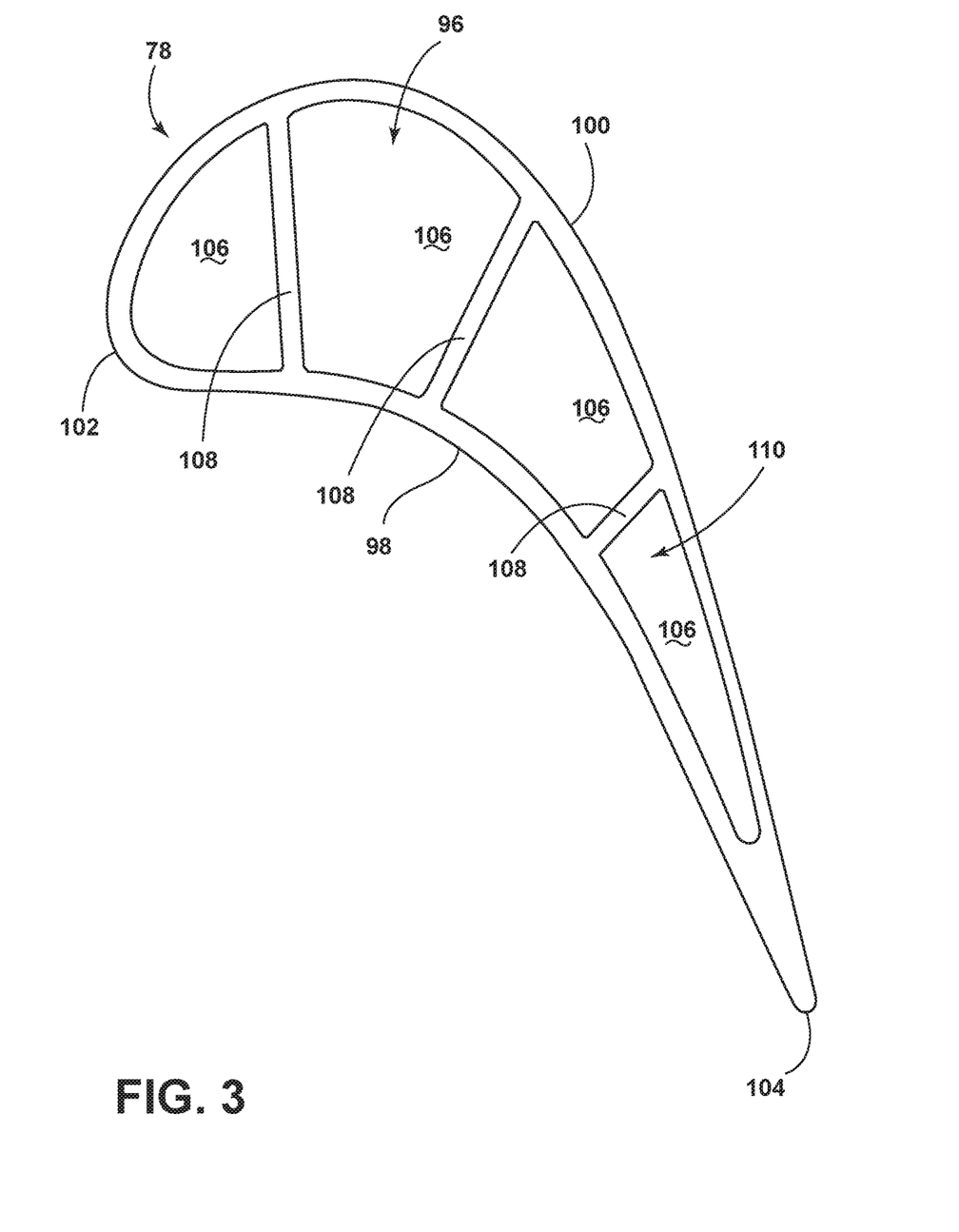
FIG. 3 is a sectional view of the airfoil of FIG. 2 having an interior with ribs defining cooling circuits.

Turning to FIG. 3, the airfoil 78, shown in cross-section, has an outer surface including a concave-shaped pressure sidewall 98 and a convex-shaped suction sidewall 100 which are joined together to define an airfoil shape, extending between a leading edge 102 and a trailing edge 104 defining a chord-wise direction. The blade 68 rotates in a direction such that the pressure sidewall 98 follows the suction sidewall 100. Thus, as shown in FIG. 3, the airfoil 78 would rotate upward toward the top of the page. The airfoil 78 further includes a plurality of ribs 108 defining a plurality of channels 106. The channels 106 can fluidly connect to one or more other channels 106 to define a cooling circuit 110 located within the interior 96 of the airfoil 78. The interior 96 can include multiple cooling circuits 110, which can be fed with a flow of cooling fluid by one or more of the inlet passages 88, 90, 92.

Figure 4:
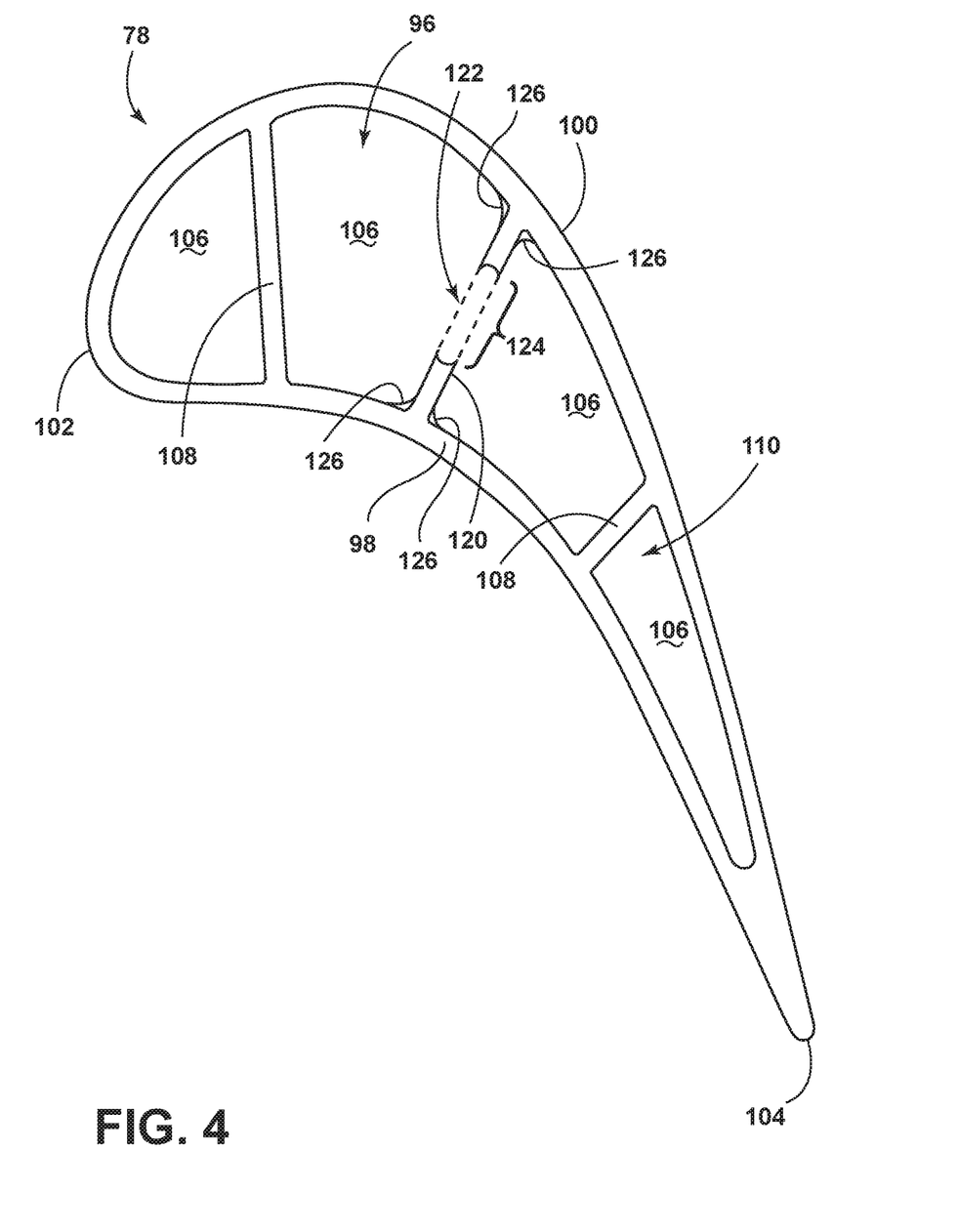
FIG. 4 is a radial section view of the airfoil FIG. 2 illustrating a gap disposed in one rib.

Looking at FIG. 4, one rib 108 can be a full-length rib 120 extending span-wise between the root 82 and the tip 80 having a thermal stress reduction structure. The thermal stress reduction structure can be a gap 122 disposed within the full-length rib 120. Alternatively, the thermal stress reduction structure can be a hole, aperture, or a series of holes. The gap 122 can be a single, continuous aperture, and/or can be a cross-over hole between two separate cooling channels 106. The gap 122 can have a width 124 as the distance of the gap 122 extending between the pressure and suction sidewalls 98, 100. The gap 122 can be centrally located between the pressure and suction sidewalls 98, 100 or can be closer to either of the sidewalls 98, 100. The gap 122 can extend only partially between the pressure and suction sidewalls 98, 100 or can extend fully between the sidewalls 98, 100. The full-length rib 120 can further include fillets 126 at the junction with the pressure and suction sidewalls 98, 100 and the gap 122 can extend between the fillets 126.

Figure 5:
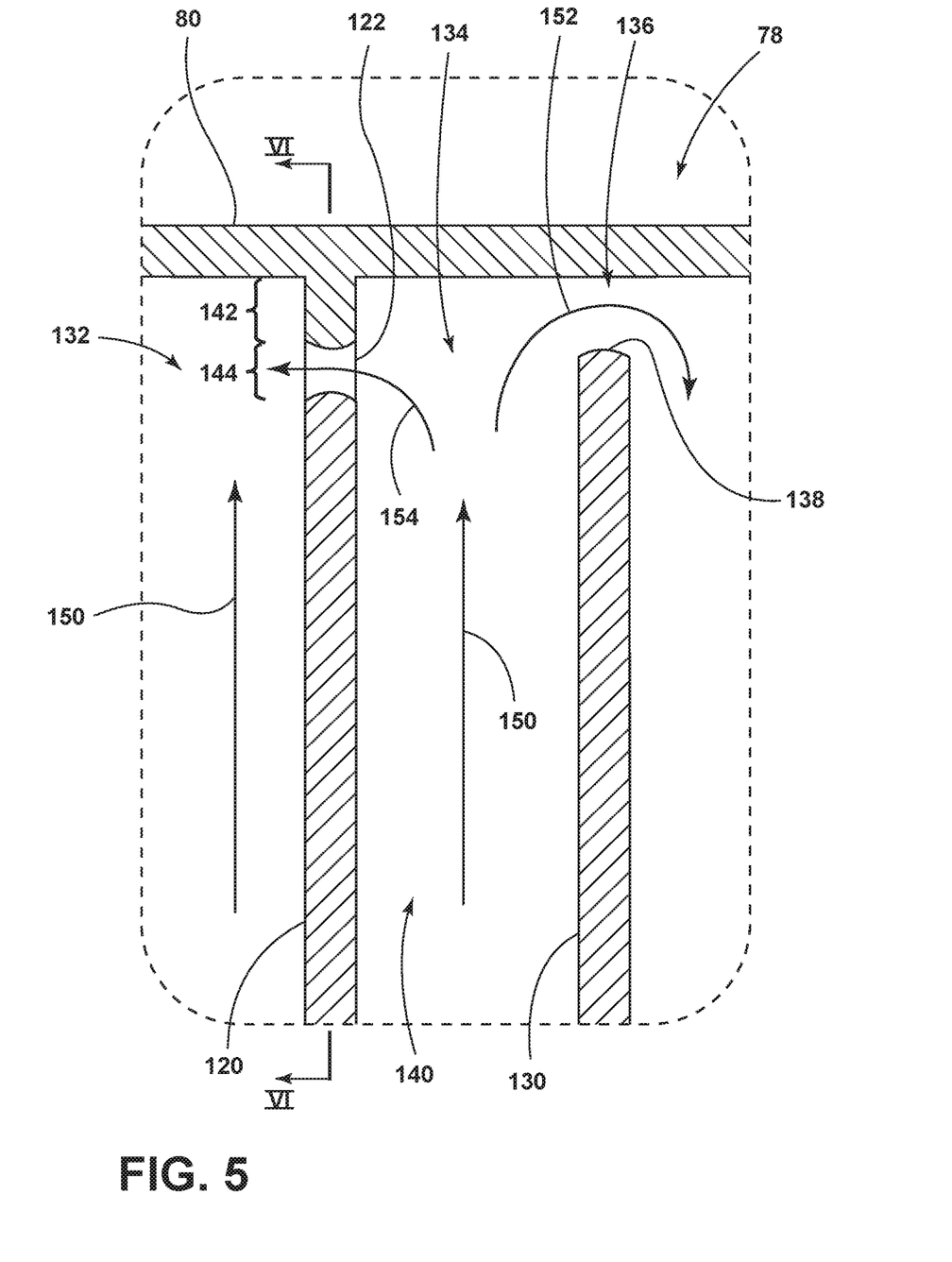
FIG. 5 is an axial section view of the airfoil of FIG. 4 illustrating a flow channel between cooling circuits.

The ribs 108 can be full-length ribs 120 or partial-length ribs 130, which are best seen in FIG. 5. The full-length rib 120 extends fully between the root 82 to the tip 80, while the partial-length rib 130 terminates prior to the tip 80 or root 82. The interior 96 of the airfoil 78 includes the full-length rib 120 and the partial-length rib 130, defining a first cooling circuit 132 and having a second cooling circuit 134 located opposite of the first cooling circuit 132 relative to the full-length rib 120. A tip turn 136 can be the area between the tip 80 and the radially outermost end 138 of the partial-length rib 130. The gap 122 can be positioned at least partially in the span-wise distance of the full-length rib 120 within the span-wise distance covered by the tip turn 136. A flow channel 140 is disposed between the ribs 120, 130 extending span-wise from the root 82 to the tip 80. The gap 122 is spaced from the tip 80 by a tip distance 142 and can have a height 144 as the largest span-wise distance of the gap 122. The gap 122 can be located span-wise at a predetermined distance from the tip 80, where the predetermined distance can be a function of the thermal gradient between the tip 80 and the full-length rib 120, and the structural stiffness.

During operation, a flow of air 150 can move through the cooling circuits 132, 134. Approaching the tip 80, a first portion 152 of the airflow 150 moves around the turn 136, continuing along the cooling circuit 134, while a second portion 154 can pass through the gap 122. The gap 122 can be sized, having the predetermined width 124 and height 144. Alternatively, the second portion airflow 154 can move through the gap 122 in the opposite direction from what is shown. The flow direction and flow volume moving through the gap 122 can further be determined by pressure differentials between the adjacent cooling circuits 132, 134. As such, the pressure differentials between the adjacent cooling circuits 132, 134 can be equivalent such that no airflow 154 passes through the gap 122.

Figure 6:
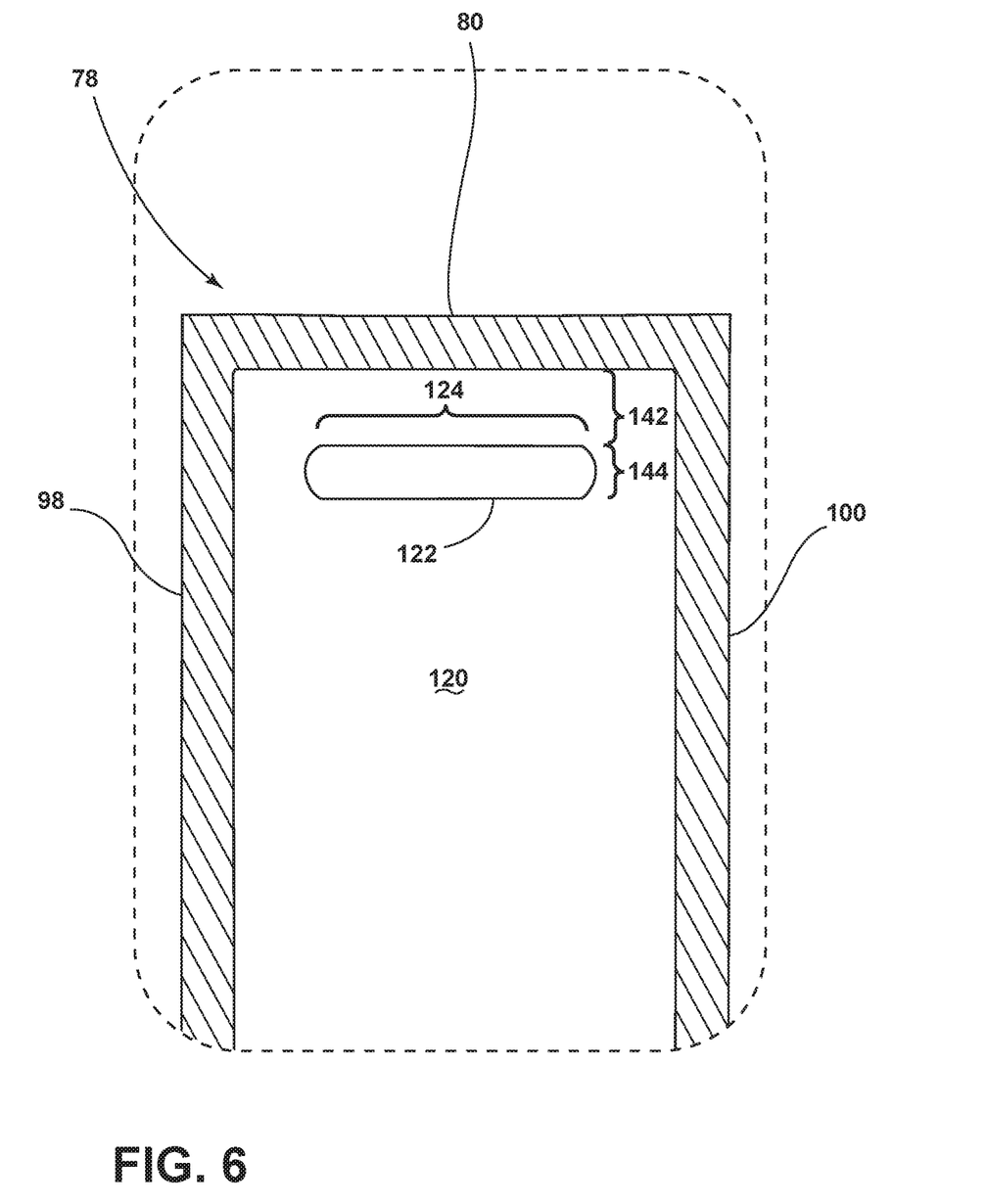
FIG. 6 is a section view of a full-length rib of FIG. 5 across section VI.

FIG. 6 illustrates a cross-sectional view of the airfoil 78, taken along section VI of FIG. 5, best showing the gap 122 within the full-length rib 120. The gap 122 has an oval shape, having opposing ends adjacent to the pressure and suction sidewalls 98, 100. The width 124 in combination with the height 144 can define a cross-sectional area for the gap 122. The tip distance 142 can determine the distance from the tip 80 of the gap 122, which can be determined as a function of the thermal gradient between the tip 80 and the full-length rib 120 as well as the structural stiffness to reach a predetermined reduction in local stress. Additionally, the tip distance 142 can be varied to reduce the instance of flow stagnation within the flow channel 140, which can occur at the junction between the full-length rib 120 and the tip 80. Furthermore, the tip distance 142 can position the gap 122 near the tip 80 to minimize operational stresses associated with thermal expansion, providing space for expansion adjacent the tip 80.

A method of mitigating thermal-induced low-cycle fatigue cracking at a full-length rib 120 can include opening at least a portion of the full-length rib 120 a predetermined distance from the tip 80. Opening a portion of the full-length rib 120 can include forming the gap 122 within the full-length rib 120. The opened portion of the full-length rib 120 can extend fully across the width of the full-length rib 120, from the pressure sidewall 98 to the suction sidewall 100, or can extend partially across the full-length rib 120. The predetermined distance can be a function of the thermal gradient and structural stiffness to reach a desired reduction in stress.

It should be appreciated that the use of the gap 122 can generate a stress reduction at the tip 80 and at the full-length rib 120 meeting the tip 80. The reduced stress results in an increase in low cycle fatigue lifetime. As can be appreciated, utilizing the gap 122 in the full-length rib 120 can reduce mechanical stresses, reducing the incidence of airfoil cracking at the tip 80 adjacent the full-length ribs 120 and increasing the operational lifetime of the airfoil 78.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a gas turbine engine, the airfoil comprising:
    an outer surface bounding an interior and defining a pressure side and a suction side extending axially between a leading edge and a trailing edge to define a chord-wise direction and extending radially between a root and a tip to define a span-wise direction;
    a first flow channel located within the interior and configured to receive fluid at an inlet at the root and extending span-wise to the tip, the flow channel partially defined by a full-length rib having only a single opening defined therethrough, the single opening consisting of a single continuous gap spaced from the tip, the full-length rib fully extending span-wise from the root to the tip and in contact with the tip and the root, and partially defined by a partial-length rib extending span-wise and terminating prior to the tip to define a tip turn;
    a second flow channel located within the interior extending span-wise from the root to the tip, the second flow channel opposite the full-length rib and fluidly connected with the first flow channel by way of the single continuous gap defined through the full-length rib spaced from the tip;
    a third flow channel located within the interior and extending span-wise from the root to the tip, the third flow channel opposite the partial-length rib and fluidly coupled with the first flow channel by way of the tip turn;
    wherein the gap in the full-length rib is configured to form a thermal stress reduction structure for the full-length rib.

2. The airfoil of claim 1, further comprising a first cooling circuit defined by the first flow channel, through the single continuous gap in the full-length rib, and the second flow channel.

3. The airfoil of claim 2, further comprising a second cooling circuit defined by the first flow channel, through the tip turn, and the third flow channel.

4. The airfoil of claim 3 wherein a common flow of air is received at the inlet of the first flow channel, and is delivered to both the second flow channel and the third flow channel simultaneously.

5. The airfoil of claim 3 wherein first cooling circuit and the second cooling circuit include a common flow of air received at the inlet of the first flow channel.

6. The airfoil of claim 1 wherein first flow channel and second flow channel are adjacent and wherein the first flow channel and the third flow channel are adjacent.

7. The airfoil of claim 1 wherein the single continuous gap through the full length rib extends for a full width of the full-length rib.

8. The airfoil of claim 7 wherein the single continuous gap through the full length rib extends from the pressure side to the suction side.

9. The airfoil of claim 1 wherein the full-length rib has fillets at one or more junctions with the suction side and the pressure side and the single continuous gap extends between the fillets.

10. The airfoil of claim 1 wherein the single continuous gap is sized to permit a predetermined airflow through the gap.

11. The airfoil of claim 1 wherein the single continuous gap is located span-wise a predetermined distance from the tip.

12. The airfoil of claim 11 wherein the predetermined distance is sized to provide space for thermal expansion of the rib and the tip.

13. The airfoil of claim 11 wherein the single continuous gap is located span-wise in the tip turn.

14. The airfoil of claim 11 wherein the predetermined distance is determined as a function of the thermal gradient between the tip and the full-length rib and a predetermined structural stiffness of the full length rib.

15. The airfoil of claim 1 wherein the airfoil comprises at least one of a blade or a vane of the gas turbine engine.

16. The airfoil of claim 15 wherein the airfoil is the blade of a turbine section of the gas turbine engine.

17. The airfoil of claim 1 wherein the single continuous gap defines an oval shape.

\* \* \* \* \*